Figure 1:
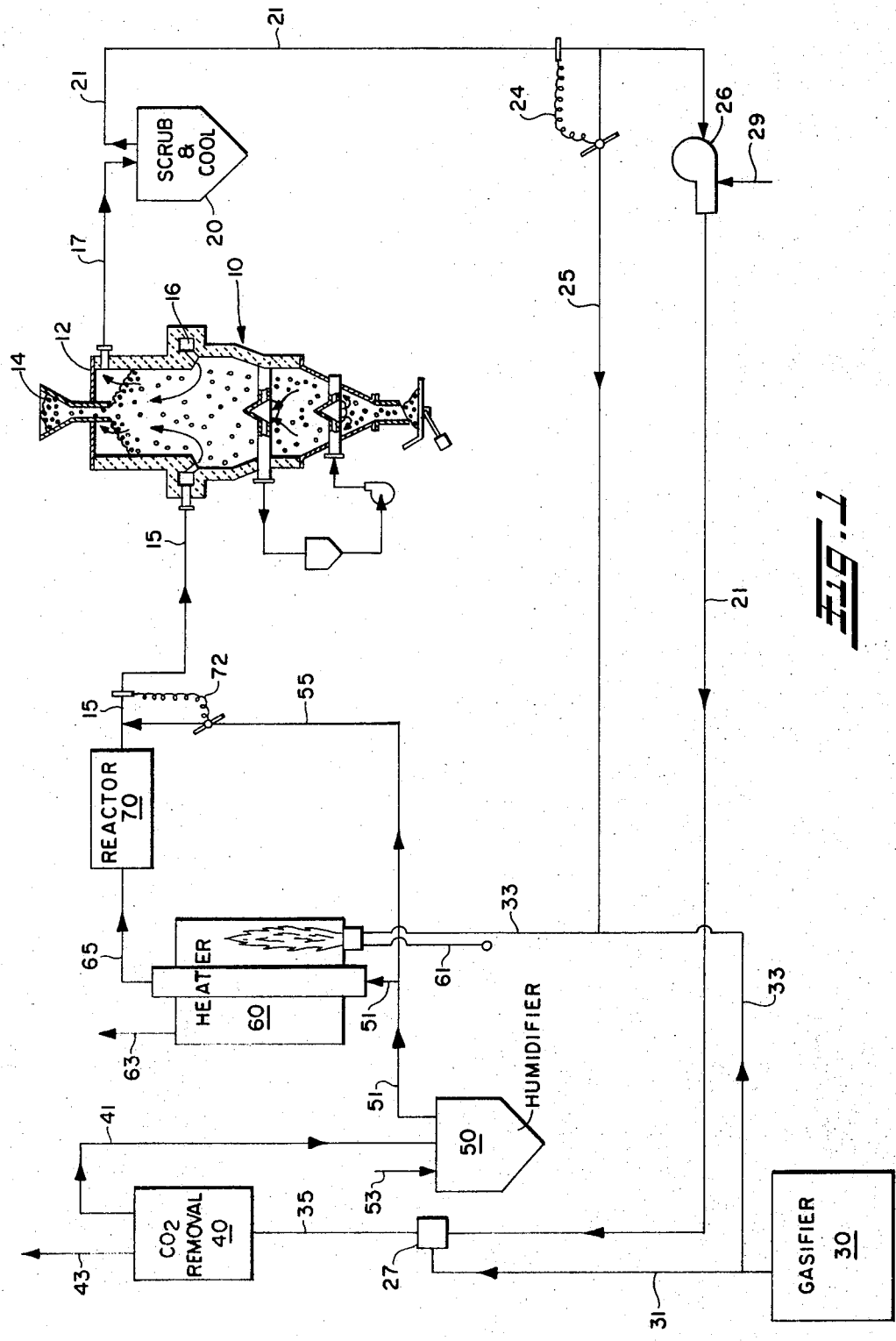

United States Patent [19]

Beggs

[11] 3,844,766
[45] Oct. 29, 1974

[54] PROCESS FOR REDUCING IRON OXIDE TO METALLIC SPONGE IRON WITH LIQUID OR SOLID FUELS

[75] Inventor: Donald Beggs, Toledo, Ohio

[73] Assignee: Midland-Ross Corporation, Cleveland, Ohio

[22] Filed: Dec. 26, 1973

[21] Appl. No.: 427,541

[52] U.S. Cl. .................................................. 75/35
[51] Int. Cl. ........................................... C21b 13/02
[58] Field of Search ....................... 75/26, 34, 35, 91

[56] References Cited
UNITED STATES PATENTS

| 3,475,160 | 10/1969 | Heinzelmann et al. | 75/35 X |
| 3,764,123 | 10/1973 | Beggs et al. | 75/35 X |
| 3,770,421 | 11/1973 | Celada et al. | 75/35 X |

Primary Examiner—L. Dewayne Rutledge
Assistant Examiner—M. J. Andrews
Attorney, Agent, or Firm—Morgan, Finnegan, Durham & Pine

[57] ABSTRACT

An economical process is provided for the direct reduction of iron ore by the efficient production of a reducing gas when the external source of fuel used in the process is a liquid or solid. A gasifier facility converts a minimal amount of fuel to a gas comprised principally of reductants which is supplemented with reductants reclaimed from the reacted off-gas produced in the reduction process. A controlled amount of water vapor is added to the gas mixture which is heated to approximately reduction furnace temperature before undergoing a shift reaction to equilibrium externally of the furnace to produce a reducing gas having a preferred gas composition.

8 Claims, 1 Drawing Figure

PROCESS FOR REDUCING IRON OXIDE TO METALLIC SPONGE IRON WITH LIQUID OR SOLID FUELS

This invention relates generally to a process for the direct reduction of iron oxide to metallic iron by a reducing gas externally supplied to a reaction vessel and more particularly to such reduction processes which produce at least a portion of the reducing gas from solid or liquid fuels as opposed to those processes which utilize natural gases as fuel.

The invention is particularly applicable to pelletized, lumped, or sized iron ore directly reduced in a vertical shaft furnace and will be described with particular reference thereto. However, it will be appreciated by those skilled in the art that the invention may have broader applications and may be applied to those reduction systems which employ rotary kilns or fluidized beds for direct reduction of iron ore.

Processes for direct reduction of iron ore to produce prereduced material or sponge iron are old in the art. Of the many varied processes known, those sponge iron processes which have heretofore achieved commercial success and to which this invention particularly relates may be defined as systems which supply reducing gas primarily composed of $H_2$ and CO reductants into a furnace, kiln or fluidized bed to react with the iron oxides in various stages of oxidation to produce metallic iron as the end product. While the fundamental reduction concept in such processes is admittedly old, it has only been recently that iron ore pellets have been successfully reduced to metallic particles suitable for use as a direct charge in steelmaking plants employing electric furnaces and the like. This success is believed directly related to the economics of the reduction plant or facility which in turn is dictated by plant hardware and, importantly, the cost of fuel used in generating a satisfactory reducing gas. More particularly, known installations in existence today may be characterized by their use of natural gas, principally methane, as fuel. The methane is reacted with oxidants in the reacted off-gas to convert the oxidants and methane into reductants. The reductants thus formed are supplemented in volume by the reductants reclaimed from the reacted off-gas. An example of such process is set forth in U.S. Pat. No. 3,748,120 which illustrates a continuous, stable process achieved by an indirectly fired catalytic reformer wherein methane is reacted with oxidants at relatively low temperature.

The above described processes are necessarily limited in application to geographical areas where gas is in abundance. Where the fuel available is a liquid, such as heavy fuel oil, or a solid, such as coal, known reduction processes cannot be used simply because there are no proven processes to gasify heavy oil or coal to a methane-rich gas which, in turn, can be reformed into a reducing gas. The only proven processes for gasifying the above fuels known is total gasification to a reducing-type gas composed principally of CO and $H_2$ reductants. Unfortunately, gasifying processes are expensive with their cost almost linearly proportional with the output therefrom. More importantly, operation of the gasifiers produces a gas which is not particularly suitable for direct reduction processes because of the ratio of reductants produced herein defined as the gases $H_2$ and CO expressed as $H_2/CO$. To modify the gasifying processes so that the reductant ratio is varied results in an inefficient process which uses excessive fuel and is prohibitive in cost.

It is thus a principal object of the subject invention to provide a process for the direct reduction of iron ore which minimizes the external source of fuel used to produce a reducing-type gas while also providing steps inherent in the process which result in the production of a high quality reducing gas.

This object along with other features of the subject invention is achieved in a system wherein the reacted off-gases are cooled and scrubbed, mixed with reducing-type gas produced from known gasifiers using liquid or solid fuel and passed through a $CO_2$ removal facility. The gas mixture leaving the $CO_2$ removal facility is composed primarily of reductants which are passed through a humidifier where a controlled amount of steam is supplied to the mixture. The gas is then heated and passed through a reactor which permits the gas mixture to undergo a water-gas shift reaction to equilibrium. As a result of this reaction, the reductants contained in the reacted off-gas and produced in the known gasifiers are efficiently utilized in the sense that the reactor reforms one reductant gas into another to achieve a proper reductant ratio.

In accordance with another feature of the subject invention, the temperature of the gas leaving the reactor is approximately at or near the desired temperature of the reducing gas when introduced into the reduction furnace. This not only permits the gas to be introduced directly into the reduction furnace without further heating, but it also prevents water-gas shift reactions from occurring in the reduction furnace. The presence of such reactions in the reduction furnace is significantly detrimental to the efficient operation of the furnace.

Yet another feature of the invention resides in its stability which, in part, occurs because the $CO_2$ removal facility is operable to remove all but a minimal amount of $CO_2$ from the gas mixture prior to heating and reacting same. This permits the quantity of steam, which can be carefully metered to the mixture, to not only control the desired reductant ratio but also to control the desired reductant/oxidant ratio of the reducing gas as the steam becomes, in converted form, the main source of oxidant in the reducing gas.

Still another feature of the invention results from the savings in the use of external fuel required in the process. While the majority of fuel savings is effected because the reacted gas is reclaimed, still further fuel savings result because the sensible heat of the shift reaction is utilized. That is, the heat resulting from the exothermic shift reaction raises the temperature of the gas mixture to permit the heater to operate at a lower temperature than would otherwise be required. Accordingly, the differential in temperature of the gases leaving the heater and reactor respectively represent a savings in fuel.

It is thus another object of the subject invention to provide in a direct reduction process utilizing a solid or liquid fuel, a shift reaction which produces a high quality reducing gas at approximately reduction furnace temperature under stable operating conditions.

Yet another object of the subject invention is to provide an economical process for an iron ore reduction system utilizing an external source of liquid or solid fuel.

The invention may take physical form in certain parts and arrangement of parts, a preferred embodiment of which will be described in detail herein and illustrated in the accompanying drawing which forms a part hereof and wherein:

FIG. 1 is a schematic diagram illustrating the process of the subject invention.

Referring now to the drawing wherein the showing is for the purpose of illustrating a preferred embodiment of the invention only and not for the purpose of limiting same, FIG. 1 illustrates, in diagram form, a process for the direct reduction of iron ore. The component parts which collectively form the process are individually and by themselves believed to be known in various arts and thus not shown or described in detail herein. These parts include a vertical shaft furnace 10, a cooler-scrubber facility 20, a gasifier facility 30, a $CO_2$ removal facility 40, a humidifier 50, a heater 60 and a reactor 70.

Vertical shaft furnace 10 has an upper end 12 into which oxide pellets 14 or other bodies, compacts or lumps containing iron oxide are fed, the pellets being removed from the bottom end of the furnace as metallic iron. Removed from furnace upper end 12 is a reducing gas inlet pipe 15 which communicates with a bustle-tuyere arrangement 16 for introducing the gas into furnace 10. Adjacent furnace upper end portion 12 is a gas off-take line 17 through which spent off-gas or reacted gas exits. A shaft furnace is illustrated because of the efficient gas utilization in such design which results from the countercurrent flow of the reducing gas passing through oxide pellets 14 as the pellets descend by gravity to the bottom of the furnace. Other reduction furnaces known as rotary kilns, batch type or fluidized bed arrangements may be employed herein in place of shaft furnace 10.

The reacted gas flows through off-take line 17 and passes to a cooler-scrubber 20 where the gas is cooled and scrubbed of dust. Although cooler-scrubber 20 can be of any conventional type, the preferred type is a direct contact water cooler, such as a counterflow packed tower with gas flowing upwardly and cooling water flowing downwardly by gravity through the packing.

The cooled and cleansed reacted gas leaves cooler-scrubber 20 through exit line 21 and a slight amount of this gas as regulated by a suitable pressure control 24 is bled from exit line 21 to a nitrogen bleed line 25 for purposes which will be explained hereafter. The major portion of the cooled and cleansed reacted gas continues to travel through exit line 21 and passes through a compressor 26. Compressor 26 sufficiently compresses the gas to a pressure suitable to permit operation of the component parts of the process and seal gas in line 29 is supplied to the bearings of compressor 26 to prevent inward leakage of air into the system. The compressed gas continues travel in exit line 21 until it reaches a mixing valve 27 where it is mixed with the reducing-type gas formed in the gasifier facility 30.

Such gasifier facilities 30 convert fuel, liquid or solid and preferably fuel oil or coal, to a reducing-type gas composed principally of CO and $H_2$ reductant gases. Generally, all such facilities utilize oxygen generated from an oxygen plant, steam generated from a steam plant and fuel which is mixed with the steam and oxygen and injected into a partial oxidation reactor to gasify the fuel. Downstream of the oxidation reactor, known apparatus is provided to scrub the unconverted carbon and remove particles from the gas such as ash. A $CO_2$ removal facility however need not be provided in gasifier facility 30 as it is one of the features of the subject invention to provide the $CO_2$ removal facility within the closed loop system of the disclosed process.

The reducing-type gas thus generated in gasifier facility 30 exits via line 31 with a portion of the gas bled therefrom to a heating line 33 which communicates with nitrogen bleed line 25 for purposes to be explained hereafter. The major portion of the reducing gas remains in line 30 which communicates with mixing valve 27; the reducing-type gas and cleansed and cooled gas being commingled therein to produce a reducing-type gas defined as a first gas mixture. The first gas mixture leaves valve 27 through amine absorber inlet line 35 and passes through a $CO_2$ removal facility 40. The $CO_2$ removal facility 40 comprises a known amine absorber tower maintained at relatively low temperature which not only separates out $CO_2$ from the first gas mixture but also absorbs some of the $H_2S$ in the reducing-type gas produced in gasifier facility 30 which exits along with the $CO_2$ through vent line 43.

The reducing-type gas leaves $CO_2$ removal facility through line 41 and is principally composed of reductants CO and $H_2$ with a residual amount of oxidants $H_2O$ and $CO_2$ and other gases, which mixture is defined as a second gas mixture. This second gas mixture enters a humidifier 50 through line 41. Humidifier 50 may comprise a conventional cooler-scrubber such as that shown at 20. However, a source of steam is usually available from gasifier facility 30 and, thus, it is preferable that humidifier 50, in essence, comprise a nozzle(s) through which a controlled amount of steam in line 53 is injected into the humidifier. If desired, line 53 may be provided with a control regulating valve in accordance with gas compositions sensed downstream of the humidifier to control the amount of steam introduced into the second gas mixture (not shown).

The second gas mixture containing a predetermined proportioned amount of steam defines a third gas mixture which exits humidifier 50 through line 51 and the major portion of the third gas mixture in line 51 enters a heater 60. In the preferred embodiment, heater 60 contains a plurality of tubes which are indirectly heated by combustibles supplied to the heater from line 33 and nitrogen bleed line 25 along with combustion air supplied from an air line 61. The spent flue gas is withdrawn from heater 60 through a flue line 63. The third gas mixture thus heated to a predetermined temperature exits heater 60 through line 65 and enters a reactor 70. Reactor 70 is a structure of predetermined volume filled with heat resistant, nickel or chrome nickel alloy packing material such as pall rings and the like which insures a water-gas shift reaction to equilibrium in accordance with the following known equation:

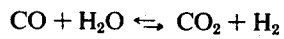

$$CO + H_2O \rightleftarrows CO_2 + H_2$$

This reaction will occur in the direction indicated because of the absence of $CO_2$ from the third gas mixture and will be at a preferred temperature of approximately 1,500°F. and within the range of 1,400°–1,600°F. for reasons hereafter stated. Heater 60 and reactor 70 thus combine to bring about the above noted reaction which produces a preferred reducing gas as it should be clear that some shift may take place in heater 60. Thus it is contemplated that heater 60 may be designed to provide sufficient residence time for the shift to equilibrium to occur entirely within the heater. Alternatively, the heater may be designed to provide a reactor tube(s) which may be filled with a catalyst of an active, metallic type, preferably nickel bearing, and generally comprising nickel deposited on or mixed with alumina carrier to assure shift equilibrium within the heater.

For control purposes, it is desired that the temperature of the reducing gas leaving reactor 70 be slightly higher than the gas temperature introduced into shaft furnace 10. Thus a step may be provided in the process to slightly cool the gas to furnace inlet temperature. This may be easily done without significantly affecting the reducing gas composition by bleeding a slight amount of relatively cold gas from humidifier exit line 51 into a cooling line 55 and introducing same to the gas inlet line 15 downstream of reactor 70. The amount of cold gas introduced into line 15 from cooling line 55 is easily regulated by a temperature control 72. Alternative cooling steps may include inserting a small cooler-scrubber downstream of the reactor or likewise bleeding a portion of cooled and cleansed reacted gas from line 21. The reducing gas leaving the reactor is thus cooled in gas inlet line 15 to a predetermined temperature and introduced into bustle and tuyere arrangement 16 for direct reduction of the iron oxides in shaft furnace 10.

The process as described may be characterized as a continuous, closed loop cycle wherein the reacted off-gas is mixed with a reducing-type gas produced in a gasifier facility 30 and reformed in a heater 60 to economically produce a reducing gas having an ideal gas composition. This may be better seen from an analysis of calculations tabulated below which show gas compositions and flow rates taken at various locations throughout the process when the process is operated with either fuel oil or coal as an external source of fuel.

The gas compositions tabulated disclose a preferred reducing gas which will result in optimum efficiency of the reducing furnace as determined by the following criteria:

1. A reductant ratio expressed as $H_2/CO$;
2. A reductant to oxidant ratio expressed as $H_2 + CO/H_2O + CO_2$; and

TABLE I

| Gas Sample Locations | FUEL OIL GAS COMPOSITION: | | | | | Flow Rate (NCM/MT) |
|---|---|---|---|---|---|---|
| | CO | $CO_2$ | $H_2$ | $H_2O$ | $N_2$ | |
| Reducing Gas-Line 15 | 0.3337 | 0.0366 | 0.5247 | 0.0581 | 0.0469 | 2067 |
| Reacted Gas-Line 17 | 0.2031 | 0.1673 | 0.3781 | 0.2047 | 0.0469 | 2067 |
| Scrubber-Cooler-Line 21 | 0.2377 | 0.1974 | 0.4424 | 0.0596 | 0.0629 | 1766 |
| Nitrogen Bleed-Line 25 | — | — | — | — | — | 353 |
| Gasifier-Line 31 | 0.4760 | 0.0440 | 0.4460 | 0.0250 | 0.0090 | 882 |
| First Gas Mixture-Line 35 | 0.3293 | 0.1385 | 0.4438 | 0.0463 | 0.0422 | 2295 |
| Flue-Line 43 | — | — | — | — | — | 308 |
| Second Gas Mixture-Line 41 | 0.3857 | 0.0050 | 0.5199 | 0.0400 | 0.0494 | 1959 |
| Steam-Line 53 | — | — | — | — | — | 108 |
| Third Gas Mixture-Line 51 | 0.3656 | 0.0047 | 0.4928 | 0.0900 | 0.0468 | 2067 |

TABLE II

| Gas Sample Locations | COAL GAS COMPOSITION: | | | | | Flow Rate (NCM/MT) |
|---|---|---|---|---|---|---|
| | CO | $CO_2$ | $H_2$ | $H_2O$ | $N_2$ | |
| Reducing Gas-Line 15 | 0.4104 | 0.0458 | 0.4337 | 0.0489 | 0.0612 | 2080 |
| Reacted Gas-Line 17 | 0.2529 | 0.2034 | 0.3157 | 0.1669 | 0.0612 | 2080 |
| Scrubber-Cooler-Line 21 | 0.2825 | 0.2289 | 0.3527 | 0.0596 | 0.0764 | 1862 |
| Nitrogen Bleed-Line 25 | — | — | — | — | — | 372 |
| Gasifier-Line 31 | 0.5410 | 0.1160 | 0.3040 | 0.0250 | 0.0140 | 958 |
| First Gas Mixture-Line 35 | 0.3837 | 0.1847 | 0.3336 | 0.0461 | 0.0519 | 2447 |
| Flue-Line 43 | — | — | — | — | — | 442 |
| Second Gas Mixture-Line 41 | 0.4764 | 0.0050 | 0.4142 | 0.0400 | 0.0645 | 1971 |
| Steam-Line 53 | — | — | — | — | — | 108 |
| Third Gas Mixture-Line 51 | 0.4515 | 0.0047 | 0.3926 | 0.0900 | 0.0611 | 2080 |

3. A reducing gas temperature introduced at the gas inlet of the shaft furnace.

More particularly, a preferred $H_2/CO$ ratio is desired to assure that the heat sensibility of the CO reducing reaction within shaft furnace 10 which is exothermic is balanced by the $H_2$ reducing reaction within shaft furnace 10 which is endothermic. That is, a $H_2/CO$ ratio greater than unity is desirable so that the $H_2$ reaction predominates to avoid sticking or clustering of the metallic particles, regulate carbon control and provide a more easily controllable overall process. This reductant ratio has been found to be within the preferred range of 1.0 to 2.0/1. In accordance with the data noted above, a reductant ratio of 1.57/1 and 1.06/1 occurs in the process of the subject invention when fuel oil and coal are used as external sources of fuel respectively. In this connection, it should be appreciated that the data above is calculated from published analysis which is believed to represent the optimum proportion of $H_2/CO$ which can be produced in known gasifiers for a typical heavy oil and a typical high ash coal.

A preferred reductant to oxidant ratio is required to control the carbon content of the metallized end particle and provide a rich reducing gas which is critical to the efficient reduction of wustite to metallic iron in the last reduction step of the shaft furnace. Generally, increasing the reductant to oxidant ratio will result in similar increases in the quality or richness of the reducing gas and the carbon content of the metallized iron. A reducing gas having a reductant/oxidant ratio of approximately 9/1 will result in a carbon content of substantially zero while imparting to the reducing gas sufficient quality or richness to efficiently transform wustite to metallic iron. While a reductant to oxidant ratio less than 9/1 will reduce iron ore to metallic iron, it should be clear that the wustite must be exposed to a greater quantity of such gas to effect such reduction and thus the efficiency of the furnace is adversely affected. On the other hand, it is desirable to supply residual amounts of $H_2O$ and $CO_2$ to the reductants in the reducing gas and a balanced equilibrium ratio among one another to prevent water-gas shift reactions from occurring within the shaft furnace. The shift reaction, being exothermic in nature, may among other things raise the temperature of the reducing gas to produce sticking or clustering of the pellets. In the gas compositions noted above, a reductant ratio of 9.06/1 and 8.91/1 occurs in the reducing gas produced from fuel oil and coal respectively.

The criteria noted above establishes a balance of the heat sensibilities occurring from endothermic-exothermic metallizing reactions within the shaft furnace for the purpose of preventing clustering or sticking of the pellet particles. With the heat sensibilities thus balanced, the controlling factor which produces the highest rate of reduction while preventing sticking or clustering of the pellets is the temperature of the reducing gas at the inlet to the shaft furnace. This temperature has been determined to be within the range of 1,300°-1,500°F. and preferably is at a temperature of approximately 1,400°F.

Having thus defined the many variables which must be controlled to produce a high quality reducing gas, a brief review of the known prior art may lead to a better appreciation of the subject invention. As may be verified from the above data, known gasifier facilities believed operating at maximum efficiency to produce the highest ratio of $H_2$ possible, at best provide reductant ratios of 0.6–0.8/1 when the external source of fuel used is coal and 0.8–1.1/1 when the external source of fuel used is oil. If reducing gas, having such reductant ratios characterized as being less than 1, were introduced into the shaft furnace at inlet temperature of 1,400°F., an exothermic reaction would predominate. Assuming this reaction was uniform throughout the cross section of the furnace, sticking of the pellets would occur. Such reducing gas would thus have to be introduced at a lesser temperature and this substantially increases the time that such gas must be in contact with the pellets to reduce same to metallic iron. Thus a greater quantity of gas must be supplied over a longer time to produce a suitable metallized end product and the efficiency of the shaft furnace is significantly reduced.

It is believed that there are no other known processes which will efficiently upgrade the reductant ratio to produce a suitable reducing gas in accordance with the above criteria other than that disclosed herein. Thus, if steam were added to the reaction vessel of the gasifier and it was assumed that the gas remained within the gasifier a sufficient residence time to produce a water-gas shift reaction to equilibrium, a substantial reduction in the operating temperature of the vessel would occur and result in incomplete gasification. If steam were added in a reactor downstream of the gasifier, a suitable reductant ratio would still not be obtained because the reacted gas would not pass through such reactor. Finally, if the gas mixture from the humidifier is heated without reacting and introduced into the reduction furnace, the water-gas shift reaction will take place within the furnace. The exothermic nature of the shift reaction within the furnace will produce a temperature rise of the gas of from 60°–65°F. when using fuel oil as a source of fuel and 75°–80°F. when using coal as a source of fuel, and this, in itself, may produce sintering. Importantly, the bustle and tuyere arrangement of the furnace introduces the reducing gas radially inwardly and because a definite time must elapse to establish equilibrium for the reaction, it is very likely that such reactions will occur in certain areas of the furnace to produce uneven localized heating of the pellets within the furnace.

In accordance with the subject invention, the excessive CO in the gas mixture is reacted with a predetermined amount of steam externally of the furnace and at a temperature approximately equal to furnace inlet temperature to produce a reducing gas of preferred composition. The reducing gas does not have to be raised in temperature prior to introduction into the shaft furnace. It is thus one aspect of the subject invention that it has been found that a reducing gas of preferred composition can be obtained by allowing a water-gas shift reaction to occur in a reactor at a far higher temperature than the temperature, typically 600°–800°F., at which such reactors have been previously operated at to produce a maximum amount of $H_2$. Another aspect of the invention resides in the absence of water-gas shift reactions within the shaft furnace as such reactions have already occurred to equilibrium externally of the furnace. This results because the ratio of steam of $CO_2$ in the gas mixture prior to reacting same is greater upstream of the reactor than such ratio is downstream of the reactor or within the shaft furnace. Thus the oxidant ratio of the reducing gas is determined by the steam supplied the gas mixture which may be easily regulated to provide optimum control of the reduction process. Another aspect of the subject invention results in the efficiency obtained by utilization of the heat sensibilities resulting from the exothermic reaction within the water-gas shift reactor. Thus, the heat given off within the reactor permits the gas mixture from the humidifier to be heated to somewhat less than the desired furnace inlet temperature and then passed through the catalytic water-gas shift reactor wherein the shift reaction will cause the gas to be further heated to furnace temperature. There has thus been defined an economic process for the direct reduction of iron ore. It is apparent that many modifications may be incorporated into such processes without departing from the spirit or essence of the invention. For example, it may be possible to eliminate humidifier 50 from the process by controlling the steam content which passes through $CO_2$ removal facility 40 and still reform the gas mixture in heater 60 to produce a preferred reducing gas composition. Also, while the reducing-type gas produced in the heater has been shown to be introduced into inlet line 35 communicating with the $CO_2$ removal facility, it should be apparent that such gas could be introduced into the system at any point downstream of shaft furnace 10 and upstream of the $CO_2$ removal facility. It is my intention to include all such modifications in the subject invention insofar as they come within the scope of the appended claims.

It is thus the essence of the invention to provide in a direct reduction system of iron ore by the use of external liquid or solid fuels to produce a reducing-type gas, an economic process achieved by reclaiming reacted gas and reforming same with such reducing-type gas to produce a reducing gas of preferred gas composition.

Having thus defined my invention, I claim:

1. In an ore reduction process wherein iron oxide particulates are fed into a first end of a reduction furnace and removed as substantially metallic iron from the opposite end of said furnace and a reducing gas is introduced at an inlet in said furnace removed from said first end and withdrawn as a stream of reacted gas from an outlet in said furnace adjacent said first end, the improvement comprising the steps of:
   producing a stream of reducing-type gas in a liquid or solid gasifier facility;
   passing at least said stream of reacted gas through a cooler-scrubber facility;
   passing said stream of reducing-type gas and said stream of cooled and cleansed reacted gas through a $CO_2$ removal facility to produce a gas mixture composed principally of reductants defined as CO and $H_2$ with residual amounts of oxidants defined as $H_2O$ and $CO_2$, said $H_2O$ predominating over said $CO_2$;
   heating said gas mixture to a predetermined temperature to react a portion of said CO reductants with a portion of said $H_2O$ oxidants to produce a predetermined quantity of $H_2$ and $CO_2$ which transforms said gas mixture into a reducing gas having predetermined compositions of $H_2$, CO, $H_2O$ and $CO_2$; and
   transferring said reducing gas to said inlet of said furnace.

2. The process of claim 1 wherein said reducing gas of preferred gas composition is directly introduced into said gas inlet of said furnace without further heating of said gas.

3. The process of claim 2 further including the steps of:
   combining said streams upstream of said $CO_2$ removal facility;
   adding a controlled amount of water vapor to said gas mixture after said mixture leaves said $CO_2$ removal facility and prior to heating same; and
   holding said heated mixture a sufficient time within a reactor at said predetermined temperature to establish equilibrium of the CO and $H_2O$ reaction.

4. The process of claim 3 further including the steps of:
   operating said $CO_2$ removal facility at a temperature which removes substantially all of said $CO_2$ from the said gas mixture; and
   cooling said reducing gas of preferred gas composition to a desired furnace inlet temperature by bleeding a regulated amount of said gas mixture downstream of said $CO_2$ removal facility and upstream of said heater and introducing same to said reducing gas of preferred composition downstream of said reactor.

5. The process of claim 3 wherein said predetermined temperature of said reducing gas leaving said reactor is within the range of 1,400°–1,600°F., said temperature of said reducing gas entering said furnace is within the range of 1,300°–1,500°F., and said reducing gas has a composition defined by reductant ratio of $H_2$/CO within the range of 1.0 to 2.0/1 and a minimum reductant to oxidant ratio of $H_2 + CO/H_2O + CO_2$ of approximately 9/1.

6. A process for directly reducing iron ore to metallic iron comprising the steps of:
   charging iron oxide particulates through the top end of a vertical reduction furnace and removing same as substantially metallic iron from the bottom end of said furnace;
   introducing a reducing gas of preferred composition into said furnace through a gas inlet removed from said top end of said furnace and withdrawing same as reacted gas from an outlet in said furnace adjacent said top end of said furnace;
   passing said reacted gas through a cooler-scrubber facility;
   producing a supplemental stream of reducing-type gas in a liquid or solid gasifier facility;
   combining said reacted, cooled and cleansed gas with said supplemental stream of gas to produce a first gas mixture;
   passing said first gas mixture through a $CO_2$ removal facility to produce a second gas mixture;
   adding a controlled amount of water vapor to said second gas mixture in a humidifier to produce a third gas mixture composed principally of reductants defined as CO and $H_2$ with residual amounts of oxidants defined as $H_2O$ and $CO_2$, said $H_2O$ predominating over said $CO_2$;
   heating said third gas mixture to a first temperature;
   holding said third gas mixture for a predetermined time within a reactor to raise said third gas mixture to a second temperature and react to approximately equilibrium a portion of said CO reductants with a portion of said $H_2O$ oxidants to transform said third gas mixture into a reducing gas having predetermined compositions of $H_2$, CO, $H_2O$ and $CO_2$; and transferring said reducing gas to said inlet of said furnace.

7. The process of claim 6 further including the steps of:

operating said $CO_2$ removal facility at a temperature which substantially removes said $CO_2$ oxidants from said first gas mixture; and controlling said second temperature by the heat supplied in said heater and water vapor supplied in said humidifier to approximately equal the desired temperature of said reducing gas at said furnace inlet.

8. The process of claim 7 wherein said predetermined temperature of said reducing gas leaving said reactor is within the range of 1,400°–1,600°F., said temperature of said reducing gas entering said furnace is within the range of 1,300°–1,500°F., and said reducing gas has a composition defined by reductant ratio of $H_2/CO$ within the range of 1.0 to 2.0/1 and a minimum reductant to oxidant ratio of $H_2 + CO/H_2O + CO_2$ of approximately 9/1.

* * * * *